United States Patent [19]
Taylor

[11] Patent Number: 5,836,103
[45] Date of Patent: Nov. 17, 1998

[54] FISHING ROD AND TACKLE CARRIER SYSTEM

[76] Inventor: Randy K. Taylor, 414 Lake Placid Dr., Bonaire, Ga. 31005

[21] Appl. No.: 767,142

[22] Filed: Dec. 16, 1996

[51] Int. Cl.⁶ .......................... A01K 97/08; A01K 97/04
[52] U.S. Cl. .................................. 43/26; 43/54.1
[58] Field of Search ............... 43/26, 54.1, 57.1; 206/315.1, 315.11, 373, 374, 375, 443; 211/64, 670.8, 117

[56] References Cited

U.S. PATENT DOCUMENTS

| | | | |
|---|---|---|---|
| 908,903 | 1/1909 | Thornton | 43/54.1 |
| 1,090,070 | 3/1914 | Keene | 43/26 |
| 2,153,549 | 4/1939 | Cooper | 43/54.1 |
| 2,823,971 | 2/1958 | Hoyt | 43/26 |
| 3,624,948 | 12/1971 | Baker | 43/26 |
| 3,987,574 | 10/1976 | Pennino | 43/26 |
| 4,353,182 | 10/1982 | Junkas | 43/54.1 |
| 5,079,863 | 1/1992 | Gillespie | 43/54.1 |
| 5,305,542 | 4/1994 | Phelps | 43/54.1 |
| 5,636,469 | 6/1997 | Pizzolo | 43/54.1 |

*Primary Examiner*—Kurt Rowan

[57] ABSTRACT

A new Fishing Rod and Tackle Carrier System for providing a fisherman with a safer and more efficient means of storing and carrying his fishing rods, and also providing a tackle box that when attached to the storage tubes will provide the fisherman with a convenient package to take on a fishing trip. The inventive device includes a tackle box which stores tackle, a cuff bracket secured to the bottom of the tackle box, and at least one tube removably coupled to the cuff bracket which receives a fishing rod.

6 Claims, 4 Drawing Sheets

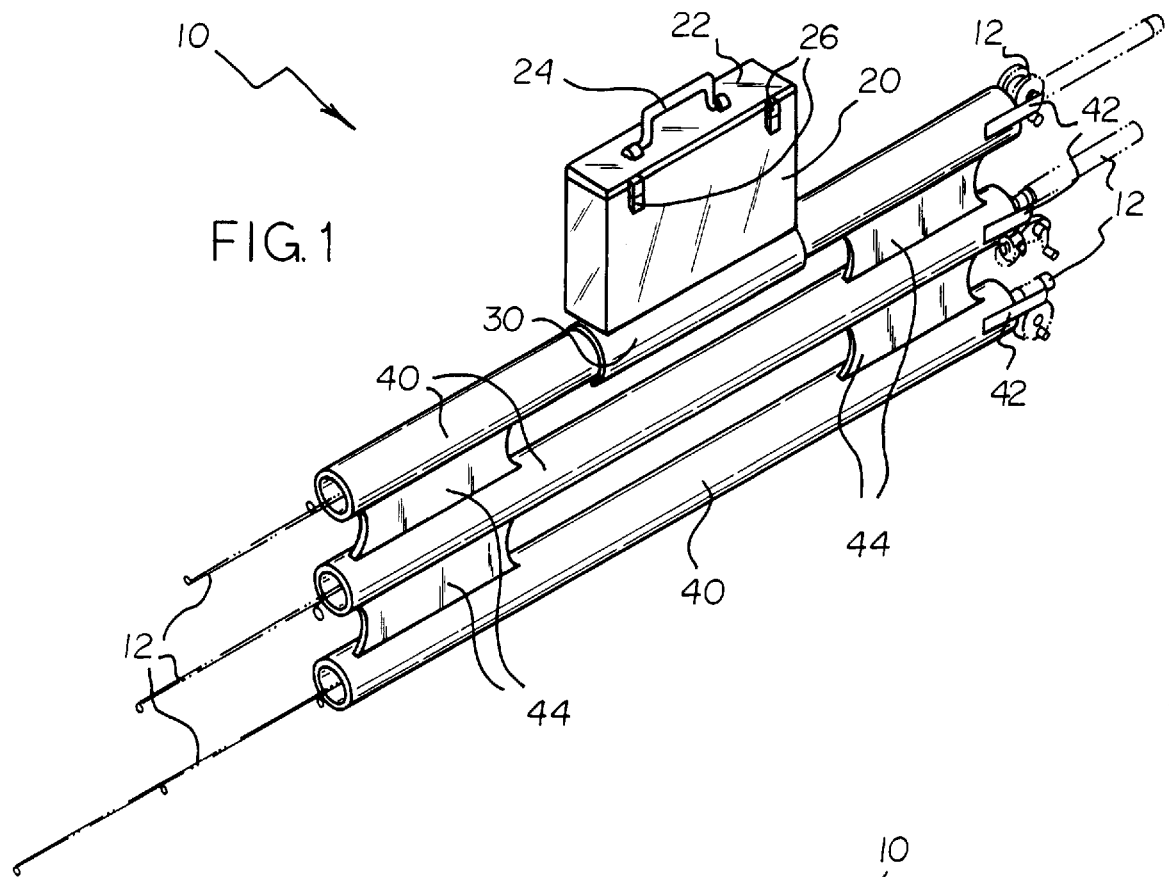
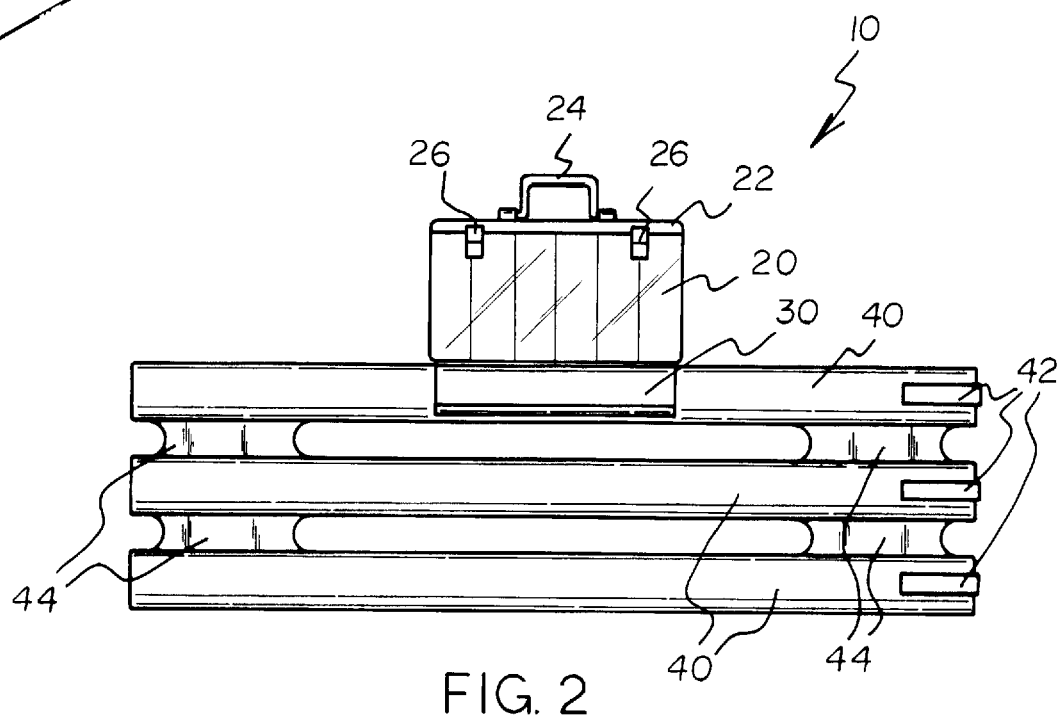

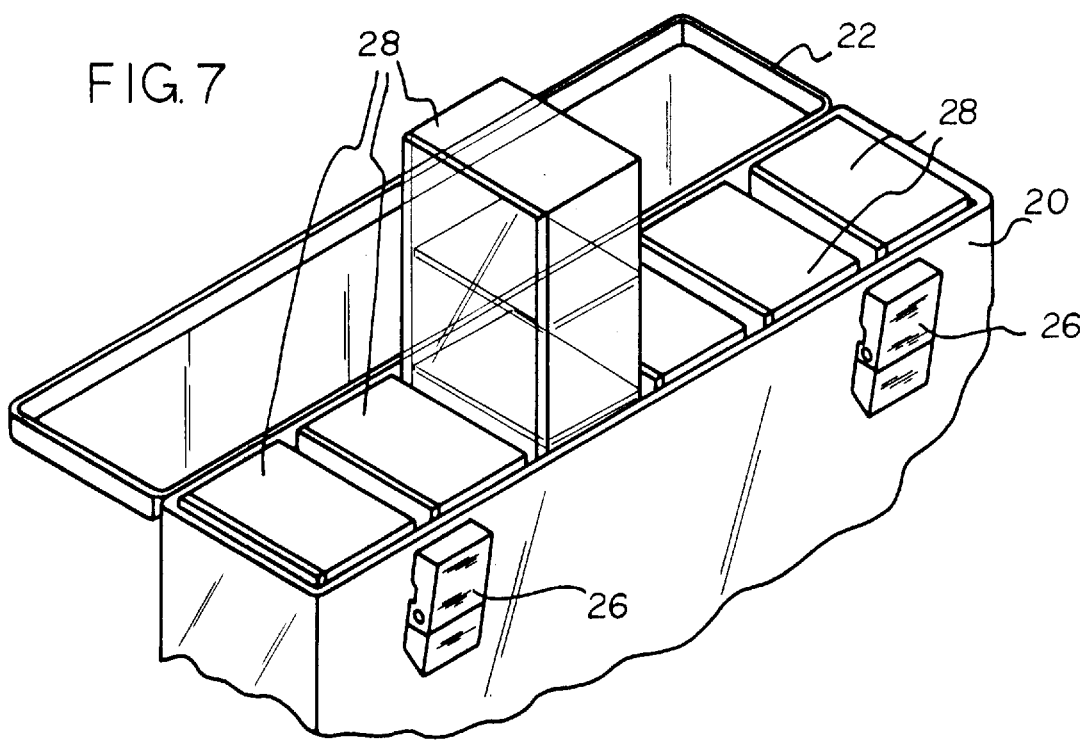

FISHING ROD AND TACKLE CARRIER SYSTEM

BACKGROUND OF THE INVENTION

1. Field of the Invention

The present invention relates to Fishing Rod and Tackle Storage Devices and more particularly pertains to a new Fishing Rod and Tackle Carrier System for providing a fisherman with a safer and more efficient means of storing and carrying his fishing rods, and also providing a tackle box that when attached to the storage tubes will provide the fisherman with a convenient package to take on a fishing trip.

2. Description of the Prior Art

The use of Fishing Rod and Tackle Storage Devices is known in the prior art. More specifically, Fishing Rod and Tackle Storage Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Fishing Rod and Tackle Storage Devices include U.S. Pat. No. 4,858,366; U.S. Pat. No. 5,071,048; U.S. Pat. No. 5,297,676; U.S. Pat. No. 5,327,669; U.S. Pat. No. 4,014,128 and U.S. Pat. No. 4,748,762.

While these devices fulfill their respective, particular objectives and requirements, the aforementioned patents do not disclose a new Fishing Rod and Tackle Carrier System. The inventive device includes a tackle box which stores tackle, a cuff bracket secured to the bottom of the tackle box, and at least one tube removably coupled to the cuff bracket which receives a fishing rod.

In these respects, the Fishing Rod and Tackle Carrier System according to the present invention substantially departs from the conventional concepts and designs of the prior art, and in so doing provides an apparatus primarily developed for the purpose of providing a fisherman with a safer and more efficient means of storing and carrying his fishing rods, and also providing a tackle box that when attached to the storage tubes will provide the fisherman with a convenient package to take on a fishing trip.

SUMMARY OF THE INVENTION

In view of the foregoing disadvantages inherent in the known types of Fishing Rod and Tackle Storage Devices now present in the prior art, the present invention provides a new Fishing Rod and Tackle Carrier System construction wherein the same can be utilized for providing a fisherman with a safer and more efficient means of storing and carrying his fishing rods, and also providing a tackle box that when attached to the storage tubes will provide the fisherman with a convenient package to take on a fishing trip.

The general purpose of the present invention, which will be described subsequently in greater detail, is to provide a new Fishing Rod and Tackle Carrier System apparatus and method which has many of the advantages of the Fishing Rod and Tackle Storage Devices mentioned heretofore and many novel features that result in a new Fishing Rod and Tackle Carrier System which is not anticipated, rendered obvious, suggested, or even implied by any of the prior art Fishing Rod and Tackle Storage Devices, either alone or in any combination thereof.

To attain this, the present invention generally comprises a tackle box which stores tackle, a cuff bracket secured to the bottom of the tackle box, and at least one tube removably coupled to the cuff bracket which receives a fishing rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Fishing Rod and Tackle Carrier System apparatus and method which has many of the advantages of the Fishing Rod and Tackle Storage Devices mentioned heretofore and many novel features that result in a new Fishing Rod and Tackle Carrier System which is not anticipated, rendered obvious, suggested, or even implied by any of the prior art Fishing Rod and Tackle Storage Devices, either alone or in any combination thereof.

It is another object of the present invention to provide a new Fishing Rod and Tackle Carrier System which may be easily and efficiently manufactured and marketed.

It is a further object of the present invention to provide a new Fishing Rod and Tackle Carrier System which is of a durable and reliable construction.

An even further object of the present invention is to provide a new Fishing Rod and Tackle Carrier System which is susceptible of a low cost of manufacture with regard to both materials and labor, and which accordingly is then susceptible of low prices of sale to the consuming public, thereby making such Fishing Rod and Tackle Carrier System economically available to the buying public.

Still yet another object of the present invention is to provide a new Fishing Rod and Tackle Carrier System which provides in the apparatuses and methods of the prior art some of the advantages thereof, while simultaneously overcoming some of the disadvantages normally associated therewith.

Still another object of the present invention is to provide a new Fishing Rod and Tackle Carrier System for providing a fisherman with a safer and more efficient means of storing and carrying his fishing rods, and also providing a tackle box that when attached to the storage tubes will provide the fisherman with a convenient package to take on a fishing trip.

Yet another object of the present invention is to provide a new Fishing Rod and Tackle Carrier System which includes a tackle box which stores tackle, a cuff bracket secured to the bottom of the tackle box, and at least one tube removably coupled to the cuff bracket which receives a fishing rod.

Still yet another object of the present invention is to provide a new Fishing Rod and Tackle Carrier System that prevents fishing rods from becoming entangled with one another.

Even still another object of the present invention is to provide a new Fishing Rod and Tackle Carrier System that provides a convenient structure to carry various types of fishing equipment with only one hand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an upper side perspective view of a new Fishing Rod and Tackle Carrier System according to the present invention.

FIG. 2 is a front view of the present invention.

FIG. 7 is an upper perspective view of the interior portion of the tackle box.

DESCRIPTION OF THE PREFERRED EMBODIMENT

Figure 3:
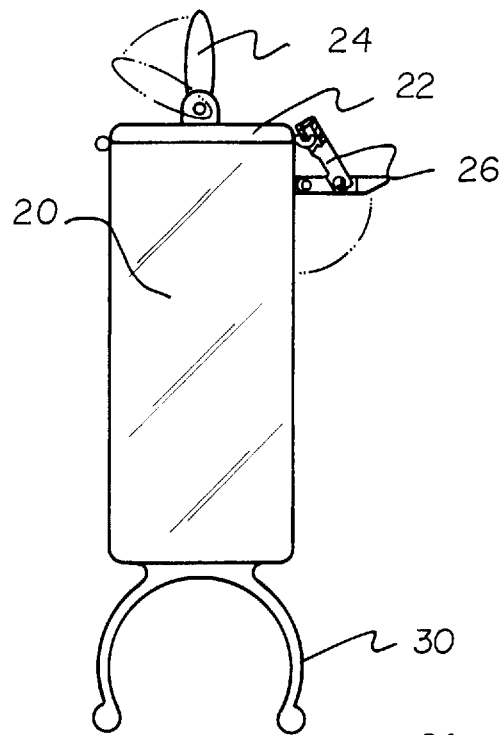
FIG. 3 is an end view of the present invention.

With reference now to the drawings, and in particular to FIGS. 1 through 7 thereof, a new Fishing Rod and Tackle Carrier System embodying the principles and concepts of the present invention and generally designated by the reference numeral 10 will be described.

More specifically, it will be noted that the Fishing Rod and Tackle Carrier System 10 comprises a tackle box 20 which stores tackle, a cuff bracket 30 secured to the bottom of the tackle box 20, and at least one tube 40 removably coupled to the cuff bracket 30 which receives a fishing rod 12.

As best illustrated in FIGS. 1 through 5, it can be shown that the tackle box 20 has a bottom exterior surface. A cuff bracket 30 has an open end as best shown in FIG. 3 of the drawings. The cuff bracket 30 is secured to the bottom exterior surface with the open end projecting away from the bottom exterior surface as shown in FIG. 3. A first plurality of tubes 40 are coupled to one another by at least one connecting member 44 mesially positioned. The plurality of tubes 40 thereby form a substantially vertical structure as shown in FIGS. 1 and 2. At least one of the tubes 40 is removably secured within the cuff bracket 30 to secure the first plurality of tubes 40 to the tackle box 20. Each of the first plurality of tubes 40 removably receives a fishing rod 12 as shown in FIG. 1 of the drawings.

Figure 6:
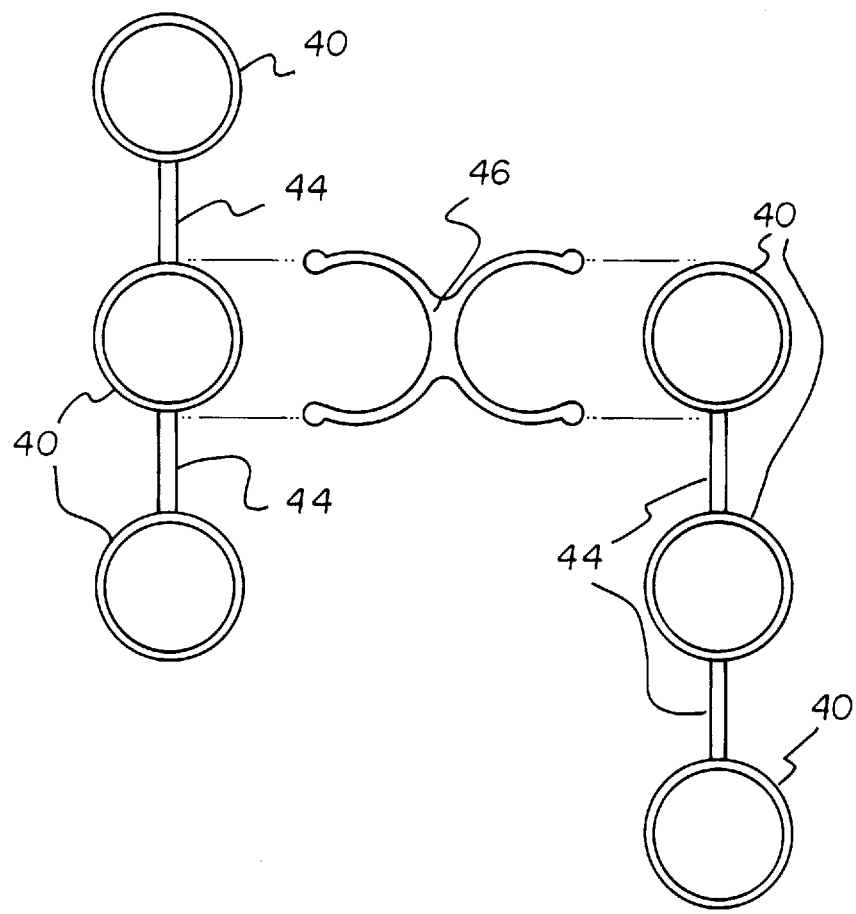
FIG. 6 is an exploded end view of the plurality of tubes and the joinder cuff.

As shown in FIG. 6 of the drawings, a second plurality of tubes 40 are coupled to one another by at least one connecting member 44 mesially positioned thereby forming a substantially vertical structure. A joinder cuff 46 is removably secured to the second plurality of tubes 40 and is removably secured to the first plurality of tubes 40 thereby connecting said first and second plurality of tubes 40. This provides an increased number of the tubes 40 for a greater number of the fishing rods 12 to be stored. As shown in FIGS. 1 and 2, a fastening strap 42 is secured to an end of the tube 40 which secures the fishing rod 12 within the tube 40.

Figure 4:
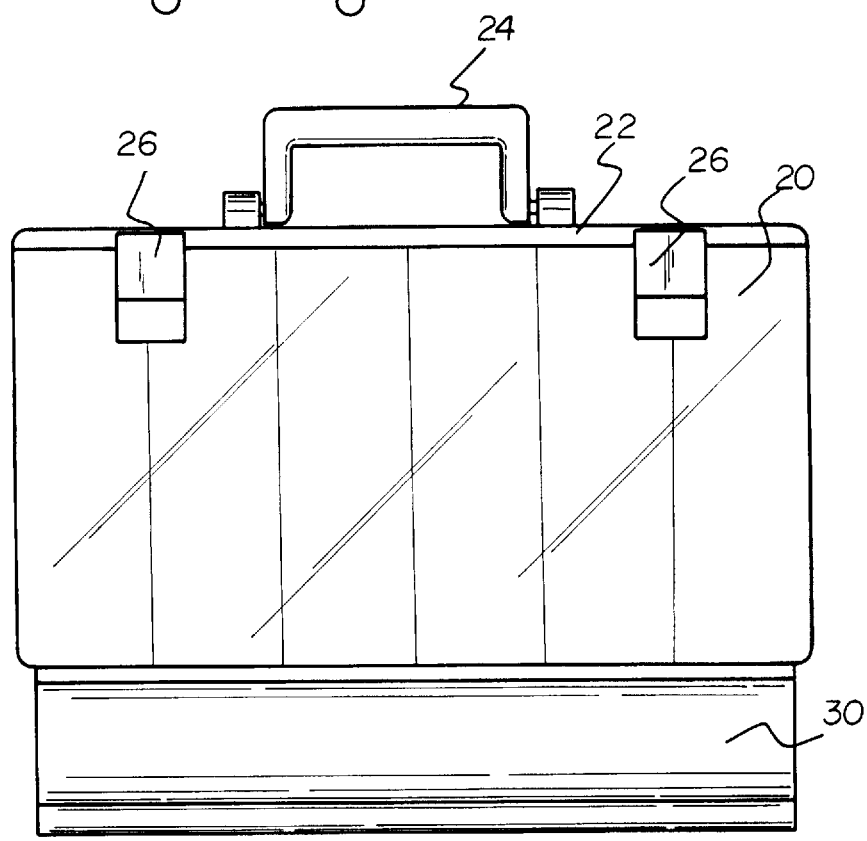
FIG. 4 is a front view of the tackle box and cuff bracket.
Figure 5:
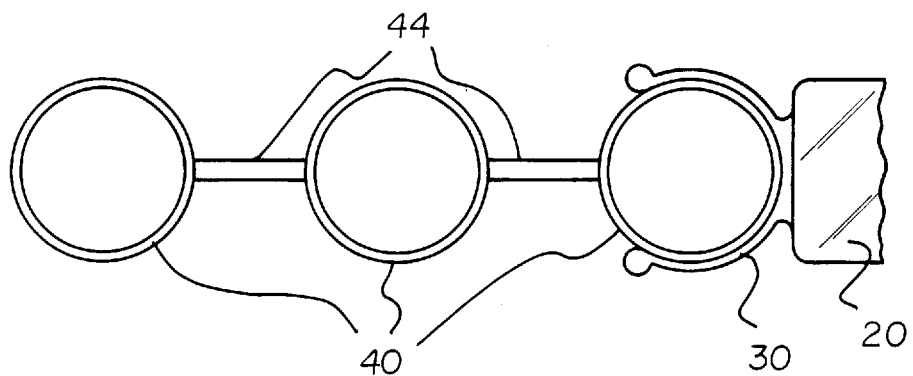
FIG. 5 is an end view of the plurality of tubes secured to one another by a plurality of connecting members.

As shown in FIGS. 1, 2, 3, 4 and 7, the tackle box 20 has a lid 22 pivotally secured having a handle 24 for carrying the present invention with one hand. At least one latch 26 is removably securing the lid 22 as best shown in FIG. 4. A plurality of removable tackle compartments 28 are positioned within the tackle box 20 as best shown in FIG. 7.

In use, at least one fishing rod 12 is positioned within the tube 40. The fastening strap 42 is secured around the fishing rod 12 to prevent accidental removal of the fishing rod 12 from within the tube 40. The user positions his or her desired tackle within the tackle compartments 28 within the tackle box 20. One tube 40 is removably coupled to the cuff bracket 30 to allow carrying of all of the tubes 40 with the fishing rods 12 directly below the tackle box 20. If the user requires an increased number of tubes 40, the joinder cuff 46 is removably coupled to one tube 40 which is secured to the tackle box 20 and removably couples the opposite end to another tube 40 securing another plurality of tubes 40.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. The fishing rod and tackle carrier system comprising:
   a tackle box having a bottom exterior surface;
   a cuff bracket having an open end;
   said cuff bracket secured to said bottom exterior surface with said open end projecting away from said bottom exterior surface;

a first plurality of tubes coupled to one another thereby forming a substantially vertical structure, where at least one of said tubes removably secures within said cuff bracket to secure said first plurality of tubes to said tackle box and where each of said first plurality of tubes removably receive a fishing rod;

a second plurality of tubes coupled to one another forming a substantially vertical structure; and a joinder cuff removably secured to said second plurality of tubes and removably secured to said first plurality of tubes, thereby providing an increased number of said tubes for a greater number of said fishing rods.

2. The fishing rod and tackle carrier system of claim 1, wherein a fastening strap is secured to an end of said tube which secures said fishing rod within said tube.

3. The fishing rod and tackle carrier system of claim 2, wherein said tackle box including:

a lid pivotally secured having a handle for carrying;

at least one latch removably securing to said lid; and a plurality of removable tackle compartments.

4. The fishing rod and tackle carrier system comprising:

a tackle box having a bottom exterior surface;

a cuff bracket having an open end;

said cuff bracket secured to said bottom exterior surface with said open end projecting away from said bottom exterior surface;

a first plurality of tubes coupled to one another by at least one connecting member mesially positioned thereby forming a substantially vertical structure, where at least one of said tubes removably secures within said cuff bracket to secure said first plurality of tubes to said tackle box and where each of said first plurality of tubes removably receive a fishing rod;

a second plurality of tubes coupled to one another by at least one connecting member mesially positioned thereby forming a substantially vertical structure; and a joinder cuff removably secured to said second plurality of tubes and removably secured to said first plurality of tubes, thereby providing an increased number of said tubes for a greater number of said fishing rods.

5. The fishing rod and tackle carrier system of claim 4, wherein a fastening strap is secured to an end of said tube which secures said fishing rod within said tube.

6. The fishing rod and tackle carrier system of claim 5, wherein said tackle box including:

a lid pivotally secured having a handle for carrying;

at least one latch removably securing to said lid; and a plurality of removable tackle compartments.

\* \* \* \* \*